June 5, 1923.
A. E. MUELLER
1,457,591
OCCUPANT PROPELLED SLED
Filed Jan. 30, 1922
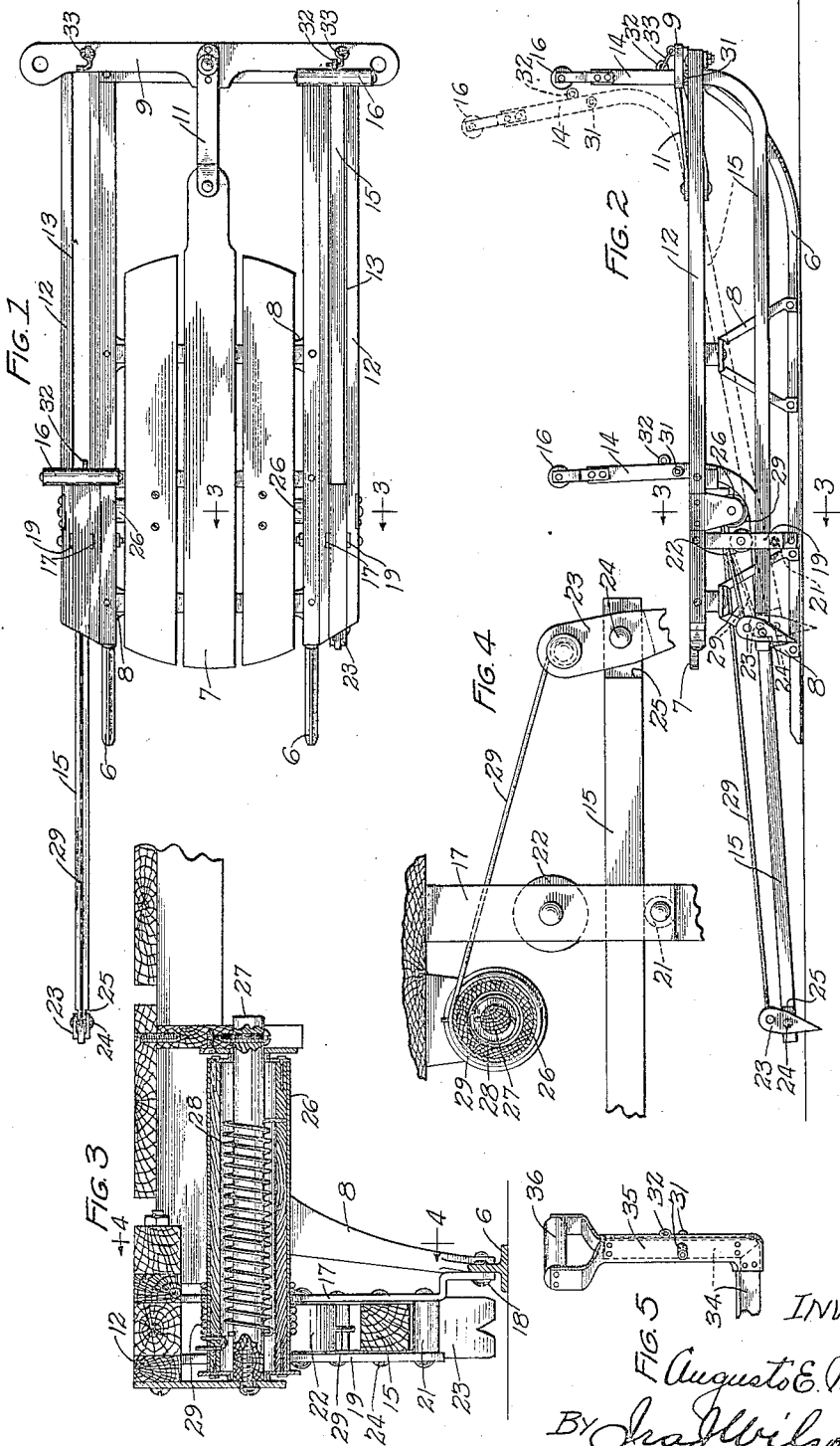
INVENTOR:
Augusto E. Mueller
By Ira J. Wilson ATTY.

Patented June 5, 1923.

1,457,591

UNITED STATES PATENT OFFICE.

AUGUSTO E. MUELLER, OF CHICAGO, ILLINOIS, ASSIGNOR OF ONE-HALF TO JOHN H. JARVIN, OF CHICAGO, ILLINOIS.

OCCUPANT-PROPELLED SLED.

Application filed January 30, 1922. Serial No. 532,529.

*To all whom it may concern:*

Be it known that I, AUGUSTO E. MUELLER, a citizen of Argentina, residing at Chicago, in the county of Cook and State of Illinois, have invented certain new and useful Improvements in Occupant-Propelled Sleds, of which the following is a specification.

This invention relates to vehicles, and while illustrated herein as applied to a sled, it should be understood that it may with equally effective results be applied to a wheeled vehicle.

One of the primary purposes of this invention is to provide propelling mechanism, by the manipulation of which the sled or other vehicle may be rapidly propelled by a rider sitting thereon.

With this general aim in view, my invention contemplates the provision of propelling mechanism which will be simple in construction, economical to manufacture, one which can be readily applied to sleds already in use, as well as to new sleds, one which will be light and not add materially to the weight of the vehicle and which will be strong, substantial and durable and also easy to operate so that a high speed of the vehicle may be attained.

Further objects and advantages of this invention should be readily appreciated as the same becomes better understood by reference to the following description, when considered in connection with the accompanying drawing, upon which one preferred embodiment of the invention is illustrated.

Referring to the drawings:

Fig. 1 is a plan view of a sled equipped with my invention;

Fig. 2 is a side view thereof;

Fig. 3 is a sectional view on the line 3—3 of Figs. 1 and 2;

Fig. 4 is a fragmentary sectional view on the line 4—4 of Fig. 3 and

Fig. 5 is a detail of a modified form of propelling member.

While, as previously stated, my invention is applicable to any preferred type of vehicle, I have illustrated it herein as applied to a sled which may be of any well known or preferred construction, that shown for illustrative purposes comprising a pair of runners 6, carrying a body consisting of the top or seat boards 7, carried upon standards or knees 8. The sled illustrated is of the flexible steering type, provided with the pivoted foot-bar 9 connected by links 11 with the seat boards.

The side members 12 of the top are provided with longitudinally extending slots 13 forming guideways in which the propelling members are adapted to reciprocate. In each of these guidways there is disposed the upstanding portion 14 of a propelling member which may be made of metal, if preferred, or for purposes of lightness is usually made of wood bent to provide the horizontal portion 15, terminating at its forward end in the upright portion 14, which is equipped at its upper extremity with a handle or grip 16.

At each side of the vehicle there is provided a guideway disposed near the rear end of the sled and comprising an upright member 17 attached by a screw 18 or other means at its lower end to a runner and at its upper end to the side member 12, and an outer member 19 rigidly attached to the member 17, but held in spaced relation thereto by spacing blocks 21. Each propelling member 15 extends through one of these guides, which is provided immediately above the propelling member with a roller 22.

The rear end of each propelling member is provided with a prong or dog 23, pivoted on the member at 24 and held against excessive tilting movement by a shoulder 25 formed on the member. When operating to propel the sled, this dog, the lower end of which is more or less pointed, engages with the snow or ground and provides an anchorage against which the backward pull is exerted upon the propelling member, thereby causing the sled to travel forwardly relatively to the stationary member. When the propelling member has been moved relatively to the sled from the position shown at the right in Fig. 1 to that shown at the left the pull upon the propelling member is released, whereupon the member is returned to normal forward position by a mechanism which will now be described.

Beneath the body of the sled at each side thereof, there is mounted a drum 26 which is rotatably disposed upon a fixed shaft 27 and is connected therewith thru a coil spring 28 tending to rotate the drum in a clockwise direction, viewing Fig. 2. A cable or cord 29, attached at one end to the periphery of the drum and at its other end to the dog 23, is wound upon the drum by the rotation of the drum under the influence of spring 28, thereby drawing the propelling member forwardly. Upon reverse movement of the propelling member the cable is unwound against the tension of the spring 28, as will be readily understood.

In order to prevent the forward ends of the propelling members from dropping, the upright portions 14 are provided with laterally extending knobs or projections 31, and for the purpose of locking these members in position when they are not to be used, they are each preferably equipped with an eye 32 adapted to be engaged by a hook 33 mounted upon the foot-bar 9.

Instead of making the propelling members entirely of wood, they may be made as shown in Fig. 5, partially of wood and partially of metal, the form shown in this figure comprising a horizontal portion 34 of wood and an upright portion 35 made of sheet iron or other preferred material, shaped to accommodate the grip or handle 36 and also provided with the lateral projections 31 and the eye 32, as previously described.

In the operation of a sled equipped with my invention, the rider sits thereon pressing his feet against the foot bar in the usual manner, and grasping the handles 16 with either hand he pulls either simultaneously or in alternation, as preferred. As the handles are pulled rearwardly, they are also slightly elevated at their forward ends so that the dogs 23 engage in the snow or ice forming an anchorage against which the thrust is exerted thereby, through the body and legs of the rider, serving to push the sled forwardly. When the propelling devices have been moved rearwardly as far as is comfortable, the pull is released, whereupon they are returned to normal position by the spring, drum and cable as previously explained. Should a bare spot be encountered which would retard the progress of the sled an upward pull is exerted upon the forward ends of the propelling members, thereby causing them to assume the position shown in dotted lines in Fig. 2, so that the roller 22 will be engaged and supported upon the propelling devices, thus carrying the weight of the sled and rider to a large extent, so that the sled will cross the bare spot and during such movement the sled will roll on the propelling devices.

While I have illustrated a preferred embodiment of the invention, it should be understood that it can be varied considerably in its details of construction within the scope of the appended claims, and while I have described but one set of propelling devices, it should be manifest that long sleds may be equipped with several such sets, thus affording facility for the exertion of propulsive effort by a number of riders.

I claim—

1. The combination with a vehicle, comprising a frame structure including longitudinally disposed side members provided with guiding slots, of propelling members, each comprising an elongated horizontal portion extending longitudinally of the vehicle beneath its respective side member and an upright portion rigidly secured to the forward end of said horizontal portion and extending upwardly through the guiding slot of said member, whereby the forward ends of said propelling members are guided, and means mounted on said frame structure beneath said side members for guiding the horizontal portions of said propelling members.

2. The combination with a sled, provided with a pair of parallel guideways, of a propelling member extending through each guideway, each member being provided at its upper end with a handle, a guide, including an anti-friction roller, through which each member projects, and a dog pivotally mounted on the rear end of each member.

3. In an occupant propelled vehicle, the combination of a body, a pair of propelling members slidably mounted thereon and having their forward ends up-turned and provided with handles, spring actuated drums carried by said body, a dog pivoted on the rear end of each propelling member, and cables connecting said dogs with said drums whereby said members are moved forwardly with respect to the body under the force of said spring.

4. The combination with a vehicle including a frame structure provided with fixed longitudinally extending guide ways, of a plurality of rigid L-shaped propelling members having their forward upturned ends slidably disposed in said guide ways to move bodily longitudinally of the vehicle, whereby said vehicle may be propelled, and means for pivotally guiding the rear ends of said members, said means including a pair of rollers mounted on said vehicle in position to ride upon said members and carry a portion of the weight of the vehicle, when said members are disposed in inclined position with their forward ends elevated and their rear ends engaged with the ground.

AUGUSTO E. MUELLER.